United States Patent
Cooper et al.

(10) Patent No.: US 6,431,593 B1
(45) Date of Patent: Aug. 13, 2002

(54) VEHICLE CRASH DETERMINATION ARRANGEMENT AND METHOD, UTILIZING CENTER OF GRAVITY, FOR AN OCCUPANT PROTECTION SYSTEM

(75) Inventors: Stephen R. W. Cooper, Fowlerville; Edward J. Gillis, South Lyon; Ron Behar, Farmington Hills; Chek-Peng Foo, Ann Arbor, all of MI (US)

(73) Assignee: TRW Inc., Lyndhurst, OH (US)

(*) Notice: Subject to any disclaimer, the term of this patent is extended or adjusted under 35 U.S.C. 154(b) by 0 days.

(21) Appl. No.: 09/687,707

(22) Filed: Oct. 13, 2000

(51) Int. Cl.[7] .............................................. B60R 21/32
(52) U.S. Cl. ........................ 280/735; 180/273; 701/45
(58) Field of Search .............................. 280/734, 735; 180/271, 273, 282; 701/45

(56) References Cited

U.S. PATENT DOCUMENTS

| | | |
|---|---|---|
| 4,985,835 A | 1/1991 | Sterler et al. |
| 5,074,583 A | 12/1991 | Fujita et al. |
| 5,118,134 A | 6/1992 | Mattes et al. |
| 5,330,226 A | 7/1994 | Gentry et al. |
| 5,366,241 A | 11/1994 | Kithil |
| 5,398,185 A | 3/1995 | Omura |
| 5,413,378 A | 5/1995 | Steffens, Jr. et al. |
| 5,446,661 A | 8/1995 | Gioutsos et al. |
| 5,490,069 A | 2/1996 | Gioutsos et al. |
| 5,732,375 A | 3/1998 | Cashler |
| 5,739,757 A | 4/1998 | Gioutsos |
| 5,821,633 A | 10/1998 | Burke et al. |
| 5,848,661 A | 12/1998 | Fu |
| 6,040,532 A * | 3/2000 | Munch ........................ 177/144 |
| 6,213,510 B1 * | 4/2001 | Suyama ...................... 280/805 |
| 6,236,308 B1 * | 5/2001 | Dalum ........................ 340/436 |
| 6,243,634 B1 * | 6/2001 | Oestreicher et al. .......... 701/45 |
| 6,250,671 B1 * | 6/2001 | Osmer et al. ................ 280/735 |
| 6,252,240 B1 * | 6/2001 | Gillis et al. ............. 250/559.38 |
| 6,259,167 B1 * | 7/2001 | Norton ....................... 307/10.1 |

OTHER PUBLICATIONS

U.S. Gillis et al. Patent Application Serial No. 09/679,327, filed Oct. 4, 2000 entitled Apparatus and Method for Protecting a Vehicle Occupant Utilizing a Correlation Between an Occupant–Associated Center and a Distance to an Occupant–Associated Surface.

* cited by examiner

*Primary Examiner*—J. J. Swann
*Assistant Examiner*—David R. Dunn
(74) *Attorney, Agent, or Firm*—Tarolli, Sundheim, Covell, Tummino & Szabo L.L.P.

(57) ABSTRACT

A vehicle crash determination arrangement (20) includes a plurality of weight sensors (52,54). The sensors (52,54) are disposed beneath a vehicle seat (16), and each sensor senses a weight value from the seat and an occupant (14) located on the seat. A center of gravity determination portion (62) of a controller (34) determines center of gravity of the seat (16) and the occupant (14) using the sensed weight values. A C.O.G. crash determination portion (64) of the controller (34) determines occurrence of a vehicle crash using change in the determined center of gravity and outputs a signal (66) indicative of the determination of crash occurrence. Preferably, the arrangement (20) is part of an occupant protection system (10) for the occupant (14). The system (10) includes an actuatable occupant protection device (24). An actuation control portion (46) of the controller (34) controls actuation of the device (24).

20 Claims, 5 Drawing Sheets

US 6,431,593 B1

VEHICLE CRASH DETERMINATION ARRANGEMENT AND METHOD, UTILIZING CENTER OF GRAVITY, FOR AN OCCUPANT PROTECTION SYSTEM

TECHNICAL FIELD

The present invention relates to determination of a vehicle crash condition for protection of an occupant, and is particularly directed to use of sensed crash-induced influence on the occupant to determine the occurrence of the vehicle crash condition.

BACKGROUND OF THE INVENTION

Occupant protection systems for use in vehicles are known in the art. One example type of protection system includes an actuatable inflatable restraint module, which has an inflatable restraint that is commonly referred to as an air bag. A controller determines whether the restraint module is to be actuated to inflate the air bag within a vehicle passenger compartment. The restraint module is actuated by the controller upon the occurrence of a predetermined condition for which a vehicle occupant is to be restrained. For example, when a crash sensor that is operatively connected to the controller senses a vehicle condition indicative of a vehicle crash condition, the restraint module is actuated.

In one example type of such an occupant protection system, the crash sensor is an accelerometer. The accelerometer is typically sensitive along a single axis (e.g., a fore-to-aft vehicle axis). Typically, such an accelerometer can have a full-scale sensitivity of 50 G, but may not be sensitive enough to detect pre-crash braking. Often it may be desirable to detect pre-crash braking (i.e., as a pre-cursor to a potential vehicle crash condition). Also, rough roads may affect the accelerometer. The effect imposed upon the accelerometer by rough roads is inversely related to the sensitivity of the accelerometer.

In view of the characteristics of the accelerometer, there is often a need for a redundant "safing" crash sensor in some occupant protection systems. The accelerometer is a primary sensor in such a system, and both the primary and the safing sensor must respond to a condition (e.g., vehicle acceleration) that is indicative of a vehicle crash condition in order for the protection module to be actuated.

One type of known safing sensor is an acceleration-activated mechanical switch. However, rough roads can adversely affect such a safing sensor in a manner similar to the adverse affect imposed upon the primary sensor. Thus, there are significant challenges to protection system designers to develop actuation algorithms that avoid the adverse influence of rough roads and the like within a system that utilizes conventional sensors. One way to avoid such challenges is to sense or determine a vehicle crash condition without the use of such conventional sensors.

SUMMARY OF THE INVENTION

In accordance with one aspect, the present invention provides a vehicle crash determination arrangement. The arrangement includes means for sensing a weight value associated with an occupant located on a seat. Means determines a weight-based center characteristic associated with the occupant using the sensed weight value. Means determines occurrence of a vehicle crash using change in the determined weight-based center characteristic associated with the occupant and outputs a signal indicative of the determination of crash occurrence.

In accordance with another aspect, the present invention provides an occupant protection system for an occupant located on a vehicle seat. The system includes an actuatable occupant protection device. Control means controls actuation of the device. A vehicle crash determination arrangement of the system includes means for sensing a weight value associated with an occupant located on a seat. The arrangement includes means for determining a weight-based center characteristic associated with the occupant using the sensed weight value. The arrangement includes means for determining occurrence of a vehicle crash using change in the determined weight-based center characteristic associated with the occupant and for outputting a signal indicative of the determination of crash occurrence to the control means.

In accordance with another aspect, the present invention provides a method of determining the occurrence of a vehicle crash. A weight value associated with an occupant located on a seat is sensed. A weight-based center characteristic associated with the occupant is determined using the sensed weight value. Occurrence of a vehicle crash is determined using change in the determined weight-based center characteristic associated with the occupant. A signal indicative of the determination of crash occurrence is output.

BRIEF DESCRIPTION OF THE DRAWINGS

The foregoing and other features and advantages of the present invention will become apparent to those skilled in the art to which the present invention relates upon reading the following description with reference to the accompanying drawings, wherein.

DESCRIPTION OF PREFERRED EMBODIMENT

Figure 1:
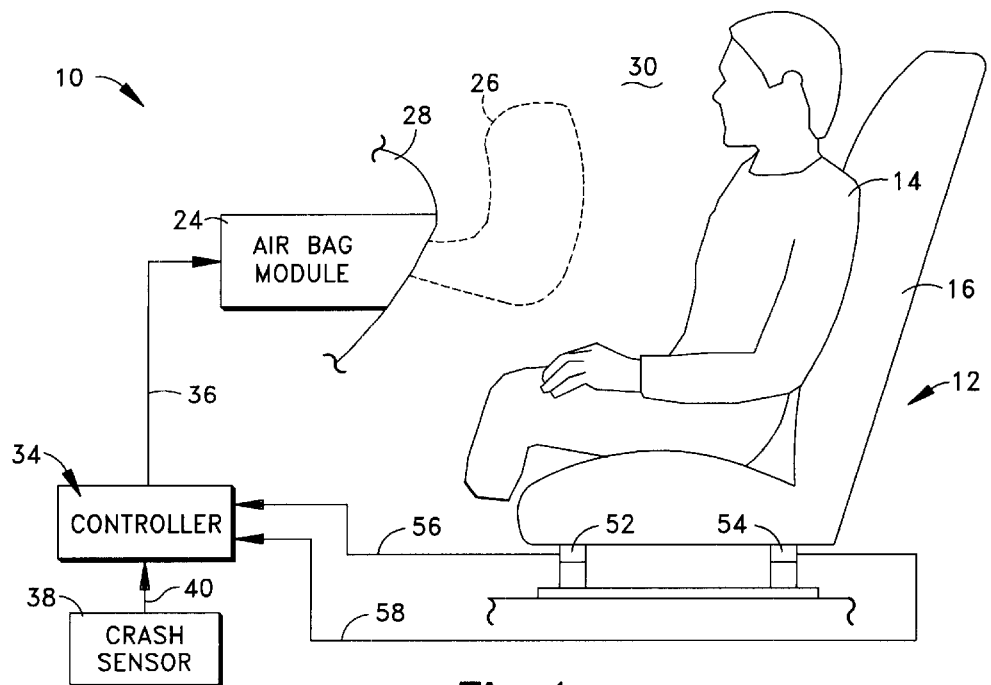
FIG. 1 is a schematic illustration of an occupant protection system incorporating the present invention, and an associated vehicle.
Figure 2:
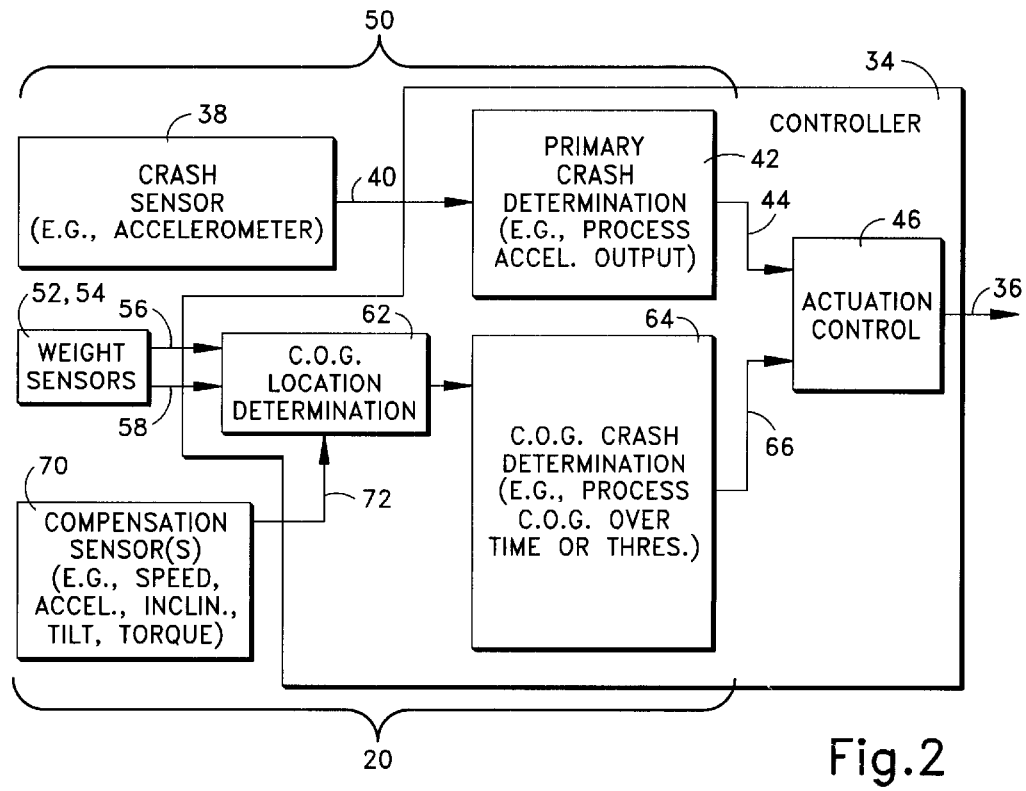
FIG. 2 is a function block diagram of portions of a controller shown in FIG. 1.

An occupant protection system 10 and an associated vehicle 12 are schematically illustrated in FIG. 1. The system 10 is provided for an occupant 14 (e.g., a front seat passenger) seated on a vehicle seat 16 within the vehicle 12. The system 10 incorporates an arrangement 20 (FIG. 2) that determines the occurrence of a vehicle crash using sensed occupant-based information, in accordance with the present invention. Hereinafter, the arrangement 20 is referred to as the occupant-based crash determination arrangement 20.

The system 10 (FIG. 1) includes an actuatable occupant protection device 24. For the purpose of illustration of the invention and not for the purpose of limitation, the specific example of the protection device 24 is an air bag module 24. The module 24 includes an inflatable cushion restraint 26 that is commonly referred to as an air bag 26. The air bag 26 is stored in a folded condition within the module 24 in a manner well known in the art.

A source (not shown) of inflation fluid (e.g., nitrogen gas) is provided within the air bag module 24 to inflate the associated air bag 26. The source of inflation fluid is commonly referred to as an inflator, and includes a stored quantity of pressurized inflation fluid and/or an inflation fluid generating material. The inflator has an associated igniter (e.g., a pyrotechnic squib) that is electrically activated to initiate flow of the inflation fluid from the inflator. The air bag module 24 is located within a dashboard or instrument panel 28 of the vehicle 12. The flow of inflation fluid to the air bag 26 inflates the air bag within an occupant compartment 30 of the vehicle 12, as will be appreciated by a person of ordinary skill in the art.

It is to be understood that the system 10 may include other and/or different occupant protection devices, and that the devices may be located elsewhere with the vehicle 12. Examples of different/additional actuatable protection system devices include a driver side air bag module, a knee bolster module, a seat belt lock, a seat belt pretensioner module, and a D-ring adjuster module. A person of ordinary skill in the art will appreciate that the actuatable protection system devices may also have adjustable actuation variable (s). Such adjustable variables include deployment timing, air bag dynamic profile, pressure, etc.

Control of the air bag module 24 is by a controller 34, which provides control signal(s) 36 to the air bag module 24. In one example, the controller 34 is a microcomputer that includes a processor performing a plurality of procedures. The controller 34 receives sensory input from several sources and, using the sensory input, makes determinations regarding air bag module control. Specifically, the controller 34 provides the signal 36 to the air bag module 24 to cause actuation of the air bag module. Preferably, the controller 34 must perform its various processes that result in actuation of the air bag module 24 within a time frame that is less than approximately 30 ms.

One of the sensory input sources for the controller 34 is a sensor 38 that senses a vehicle condition for which the occupant 14 is to be protected via actuation of the air bag module 24, and provides a signal 40 to the controller 34 indicative of the sensed vehicle condition. In the illustrated example, the sensor 38 is a crash sensor that senses a condition indicative of a vehicle crash. Preferably, the crash sensor 38 is an accelerometer, and the signal 40 is an electrical signal having a characteristic indicative of the sensed deceleration (e.g., voltage, frequency, etc.).

The controller 34 (FIG. 2) includes a portion 42 that processes the deceleration information derived from the signal 40, and determines whether the sensed deceleration is indicative of a vehicle crash. Hereinafter, the portion 42 of the controller 34 that determines if the sensed deceleration is indicative of a vehicle crash is referred to as a primary crash determination portion 42. As an example, the primary crash determination portion 42 determines if the sensed deceleration exceeds a predetermined threshold value. Upon a determination that the sensed deceleration is indicative of a vehicle crash, the primary crash determination portion 42 outputs a signal 44 to an actuation control portion 46 of the controller 34. The crash sensor 38 and the primary crash determination portion 42 together comprise a vehicle-based crash determination arrangement 50.

Other input sources for the controller 34 include a plurality (e.g., two) of weight sensors 52 and 54 that are part of the occupant-based crash determination arrangement 20. Each of the weight sensors 52 and 54 (FIG. 1) is located beneath the seat 16 (e.g., between the seat and the associated support structure). The first weight sensor 52 is located beneath a forward portion of the seat 16 and is referred to as a front weight sensor 52. The second weight sensor 54 is located beneath a rearward portion of the seat and is referred to as the rear weight sensor 54. The weight sensors 52 and 54 output signals 56 and 58, respectively, that are indicative of sensed weight values. In one embodiment, the weight sensors 52 and 54 may be of the type utilized for occupant presence/position sensing arrangements.

The controller 34 (FIG. 2) includes portions 62 and 64 that utilize the signals 56 and 58 provided by the weight sensors 52 and 54 to determine the occurrence of a vehicle condition (e.g., a vehicle crash) for which the occupant 14 (FIG. 1) is to be protected via actuation of the air bag module 24. These portions 62 and 64 (FIG. 2) of the controller 34 and the weight sensors 52 and 54 together comprise the occupant-based crash determination arrangement 20.

In one embodiment, the occupant-based crash determination arrangement 20 provides an indication signal 66 regarding the vehicle condition (e.g., sudden vehicle deceleration indicative of a vehicle crash) that is somewhat redundant of the indication signal 44 provided by the vehicle-based crash determination arrangement 50. Preferably, both the vehicle-based crash determination arrangement 50 and the occupant-based crash determination arrangement 20 must indicate the vehicle condition (e.g., sudden vehicle deceleration indicative of a vehicle crash) to the actuation control portion 46 of the controller 34 as a prerequisite to the actuation control portion providing the actuation signal 36 to the air bag module. Thus, the occupant-based crash determination arrangement 20 can be thought of as a "safing" sensor arrangement. However, it is to be appreciated that the occupant-based crash determination arrangement 20 need not be used as a "safing" sensor arrangement.

Turning to the specifics of the occupant-based crash determination arrangement 20, the arrangement determines the occurrence of a vehicle crash condition via monitoring a center of gravity (C.O.G.) of the occupant and the seat (herein after referred to as the combined C.O.G. of the occupant and the seat). In order to accomplish this function, the first portion 62 of the controller 34 within the arrangement 20 determines the location of the combined C.O.G., and the second portion 64 of the controller within the arrangement determines whether movement of the combined C.O.G. is indicative of a vehicle crash condition. Hereinafter, the portion 62 of the controller 34 that determines the combined C.O.G. is referred to as the C.O.G. location determination portion 62, and the portion 64 of the controller that determines whether movement of the combined C.O.G. is indicative of a vehicle crash condition is referred to as a C.O.G. crash determination portion 64.

The sampling of the signals 56 and 58, the determination of the location of the combined C.O.G., and the determination of whether movement of the combined C.O.G. is indicative of a vehicle crash condition are all done at relatively short intervals to permit timely determinations. For example, the sampling of the signals 56 and 58, and the determination of the location of the combined C.O.G. are done at a frequency of 1000 or more times per second.

Figure 3:
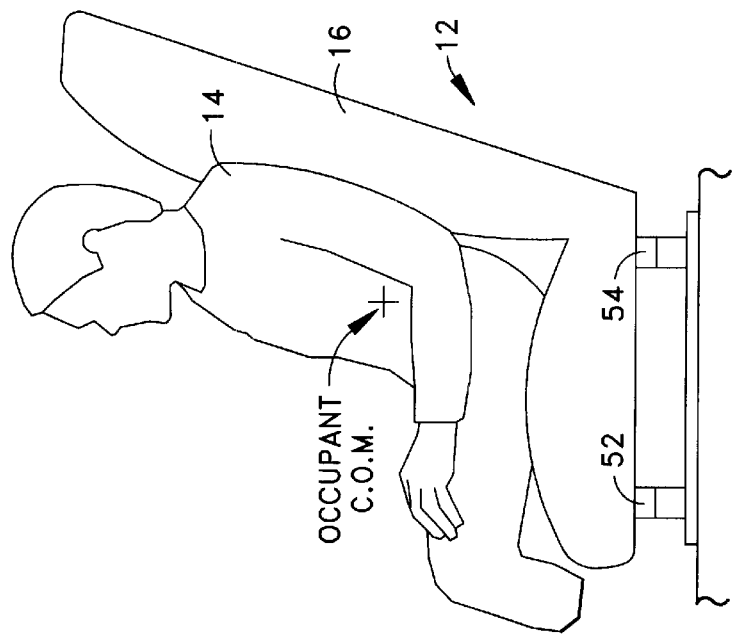
FIG. 3 is a schematic illustration of an occupant and a vehicle seat prior to a vehicle crash condition.

Attention is now directed to applied forces and reactions of the occupant 14 (FIG. 1) and the seat 16 that permit a crash determination to be made. In a static condition (i.e., no external acceleration force, except for gravity, acting upon the occupant 14 and the seat 16) the sum of the weight values from the two weight sensors 52 and 54 is equal to the weight of the occupant 14 and the seat 16 (FIG. 3). The division of the total weight of the occupant 14 and the seat 16 between the two weight sensors 52 and 54 is dependent upon the location of a center of mass (C.O.M.) of the occupant and a C.O.M. (not identified in the Figures) of the seat 16.

For purposes of explanation, the term "C.O.M." (center of mass) refers to the true center of mass of the occupant and seat. The term "combined C.O.G." (center of gravity) will refer to the apparent center of gravity as calculated from the distribution of vertical forces on the front and rear weight sensors on the assumption that gravity is the only force acting. When there are additional forces acting such as the horizontal, inertial force induced by the crash deceleration, the true C.O.M. and apparent C.O.G. can differ drastically provided that there is a non-zero moment arm between the C.O.M. and the sensors.

Figure 4:
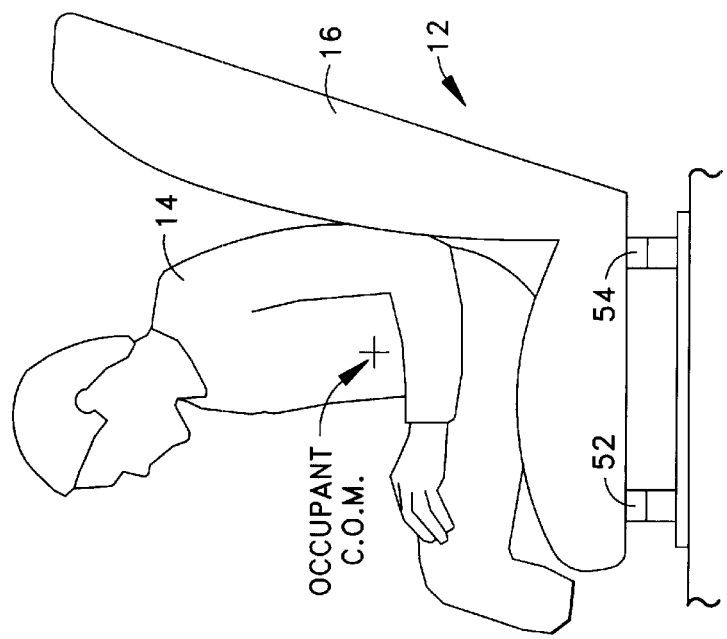
FIG. 4 is an illustration similar to FIG. 3, but shows the occupant at a position achieved at some time after occurrence of the vehicle crash condition.

Upon the onset of a frontal vehicle crash (FIG. 4), the occupant 14 is urged forward relative to the vehicle 12 and the seat 16 due to inertia (perceived by the occupant as an acceleration). The location of the C.O.M. of the occupant 14 will, of course, change as the occupant moves with respect to the seat 16 and the weight sensors 52 and 54. However, the forward motion of the occupant 14 will be very slow on the time scale of a vehicle crash.

Relatively little movement of the true occupant C.O.M. occurs within the time scale in which a crash is normally detected (e.g., approximately 30 ms). Thus, it would be difficult to make a timely determination regarding the occurrence of the vehicle crash via monitoring of movement of the C.O.M. of the occupant 14, per se. Such a difficulty also exists for a consideration of a combined C.O.M. (not identified in FIGS. 3 and 4) of the occupant 14 and the seat 16.

Turning to the combined C.O.G. of the occupant 14 and the seat 16, the combined C.O.G. changes in response to various influences. In particular, the combined C.O.G. of the occupant 14 and the seat 16 is affected by sudden relative acceleration (i.e., vehicle deceleration) force that is perceived by the occupant and the seat due to a frontal vehicle crash. The combined C.O.G. changes significantly and quickly due to the sudden relative inertial force induced by the crash deceleration.

Figure 5:
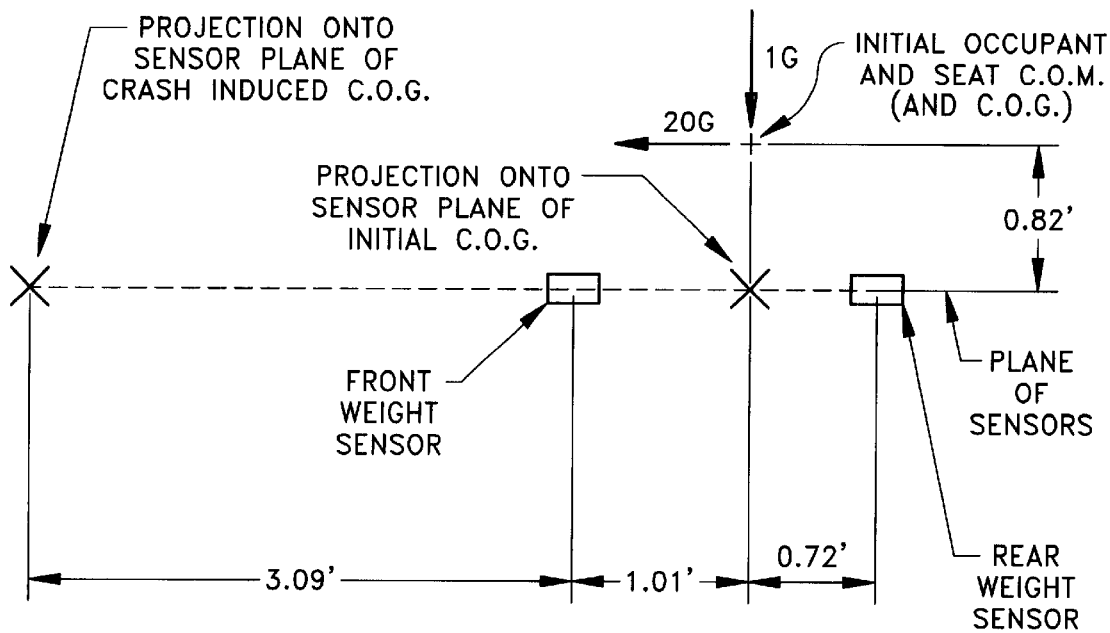
FIG. 5 is a graphical representation showing displacement of occupant and seat center of gravity upon occurrence of the vehicle crash condition.

Consider the example of FIG. 5, in which the initial location of the combined C.O.M. of the occupant 14 and seat 16 is shown with respect to the weight sensors 52 and 54. Initially the combined C.O.G. of the occupant 14 and the seat 16 is coincident with the combined C.O.M. of the occupant and the seat, because gravity is the only perceived force acting upon the occupant and the seat.

The initial combined C.O.G. is located 1.01 feet behind the front weight sensor 52 and is located 0.72 feet in front of the rear sensor 54. This can easily be understood by projecting the location of the initial combined C.O.G. onto the horizontal plane that contains the weight sensors 52 and 54. The initial combined C.O.G. is located 0.82 feet above the plane of the weight sensors 52 and 54. Assuming a 175 lb. combined weight for the occupant 14 and the seat 16 and static conditions, the weight values sensed by the front and rear weight sensors 52 and 54 could be determined as:

$$0 = 175*1.01 - w_r(1.01 + 0.72)$$

$w_r = 102.167$ lbs
$w_f = 175 - w_r$
$w_f = 72.833$ lbs.

where $w_f$ (72.833 lbs.) is the weight portion exerted on the front weight sensor 52 and $w_r$ (102.167 lbs.) is the weight portion exerted on the rear weight sensor 54. It is to be noted that the static requirement of total torque equaling zero is used to solve for the weight portions, and torque is calculated relative to the front weight sensor 52.

Now assume that a 20 G crash deceleration occurs. In the frame of the seat 16, this will appear as a 20 times total weight force applied in the forward direction (from right to left in FIG. 5) to the combined C.O.M. Again, setting torque =0, the front and rear weight portions and the new location of the combined C.O.G. (i.e., the crash-induced C.O.G.) are solved. However, it is to be noted that the human body is not rigid and static conditions of the human body do not prevail. The torso of the human body is hinged relative to the lower body, and the arms are hinged relative to the torso.

For purposes of determining a qualitative as opposed to a quantitative effect, it will be assumed that the effect of the rotating torso is to lessen the amount of torque that the occupant can exert on the seat (depending on how or whether they are belted, here it is assumed that the occupant is unbelted). This will be approximated by reducing the effective C.O.M. moment arm by one-half, and by reducing the total weight force for the lateral 20 G component by one-half. In real cases this factor could be larger or smaller depending on body type, use of seat belt and any stiffening reactions by a real occupant.

With these assumptions, the weight forces and location of the crash-induced C.O.G. are calculated as follows:

$$0 = \frac{20}{2} * 175 * \frac{0.82}{2} - 175 * 1.01 - w_r(1.01 + 0.72)$$

$w_r = -312.57$ lbs
$w_f = 175 - w_r$
$w_f = 487.57$ lbs $$\text{C.O.G.} = \frac{(1.01 + 0.72)w_r}{w_r + w_f}$$

C.O.G.=−3.09 ft.

where the location of the crash-induced C.O.G. is given as a distance relative to the front weight sensor 52, and is seen to be 3.09 feet in front of the front sensor weight 52 in FIG. 5. The C.O.G. location determination portion 62 of the controller 34 repeatedly performs such calculations to constantly update the location of the combined C.O.G. Clearly, a large crash deceleration can have a large effect on the location of the combined C.O.G. as determined from the weight sensor readings.

Crash deceleration causes the greatest amount of change of the location of the combined C.O.G. and causes the quickest rate of change of location of the combined C.O.G. The C.O.G. crash determination portion 64 of the controller 34 makes one or more determinations about the change of location of the combined C.O.G., and makes a determination as whether the vehicle is in a crash condition based upon the C.O.G. determination(s). Specifically, the C.O.G. crash determination portion 64 determines if the displacement of the location of the combined C.O.G. exceeds a threshold distance value and/or determines if the rate of change of the location of the combined C.O.G. exceeds a threshold rate of change value.

Figure 6:
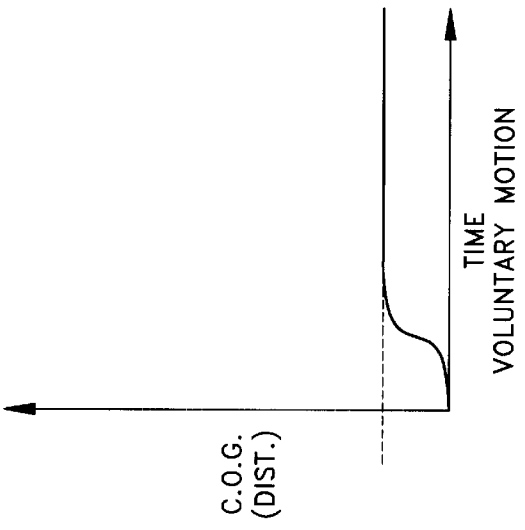
FIG. 6 is a graph showing displacement of occupant and seat center of gravity induced by occupant voluntary movement.
Figure 7:
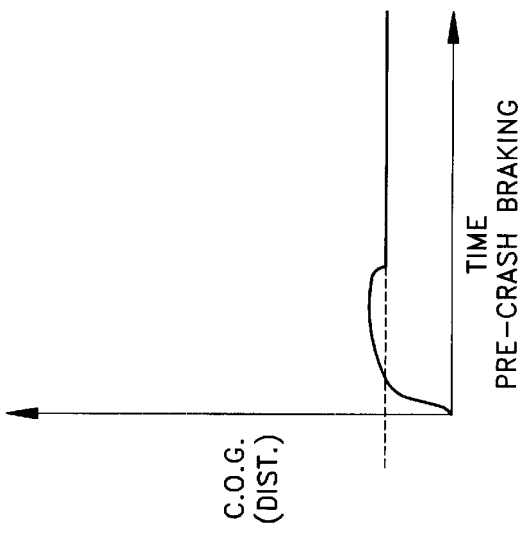
FIG. 7 is similar to FIG. 6, but the displacement is induced by pre-crash vehicle braking.
Figure 8:
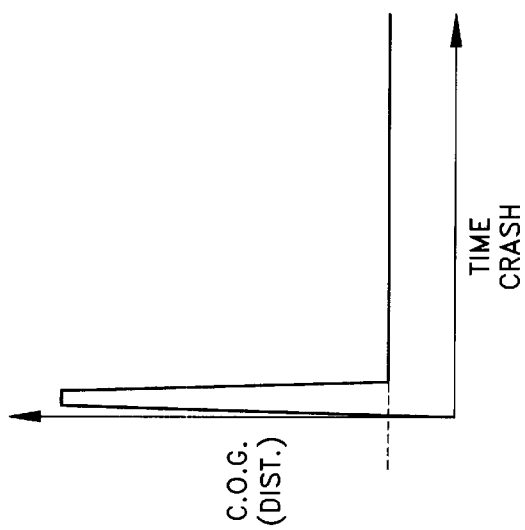
FIG. 8 is similar to FIG. 6, but the displacement is induced by the vehicle crash condition.

As illustrations of how the change of the location of the combined C.O.G. differs for various situations, attention is directed to FIGS. 6–8.

FIG. 6 illustrates the displacement forward (i.e., the change of location from the initial location) of the combined C.O.G. of the occupant 14 and the seat 16 due to voluntary forward movement of the occupant. It is to be noted that the occupant 14 has little mechanism to exert a forward torque on the seat 16, and thus can primarily change the combined C.O.G. only to the extent that the occupant can move his/her own C.O.M. There is a limit to the extent that the occupant can shift his/her own C.O.M. and remain on the seat. The horizontal dash lines in FIGS. 6–8 identify this maximum shift of the C.O.G. that can be obtained via voluntary occupant movement. It can be seen in FIG. 6 that the amount of distance change achieved by the voluntary movement of the occupant rises only to this maximum distance amount.

Also, in order to accomplish the voluntary movement, the occupant has to accelerate his/her own body mass, and build up velocity to accomplish the voluntary movement. This results in a relatively low rate of change (i.e., slope of the increasing portion of the plot of FIG. 6) of the location of the combined C.O.G. of the occupant 14 and the seat 16.

FIG. 7 illustrates the displacement forward (i.e., the change of location from the initial location) of the combined C.O.G. of the occupant 14 and the seat 16 due to pre-crash braking. Pre-crash braking typically causes a 1 G or less relatively forward force to be exerted on the occupant 14, and can cause a certain amount of rapid forward shift in the combined C.O.G. of the occupant 14 and the seat 16. If the occupant 14 is unrestrained and unbraced and given a sufficiently long braking time, the occupant could easily be far forward when the braking ceases and the location of the combined C.O.G. of the occupant and the seat 16 would be similar to the location achievable via voluntary movement.

However, the signature for a pre-crash braking event is a quicker forward displacement of the combined C.O.G. of the occupant 14 and the seat 16, as compared to displacement of the combined C.O.G. due to voluntary movement. During the braking, the forward displacement of the combined C.O.G. continues to increase as the occupant 14 moves far forward. If the braking continues with the occupant 14 far forward, the forward displacement of the combined C.O.G. will rise somewhat above the maximum that is achieved by voluntary occupant motion. As soon as the braking is removed, the displacement of the combined C.O.G. drops to the level of displacement achieved by voluntary occupant motion.

FIG. 8 illustrates the forward displacement (i.e., the change of location from the initial location) of the combined C.O.G. of the occupant 14 and the seat 16 due to a crash. Upon the occurrence of the crash, the occupant 14 and the seat 16 exert a large, instantaneous forward torque on the seat. The torque is perceived by the weight sensors 52 and 54, and shifts the combined C.O.G. forward before the occupant 14 has even started to move forward. Also, the torque shifts the combined C.O.G. forward much further than what could be accomplished by forward shifting of the occupant C.O.M. (i.e., occupant movement). When the crash ends, the location of the combined C.O.G. reverts to the maximum that can be achieved for an occupant that is far forward (this assumes that the occupant is still partially in the seat otherwise it reverts to empty seat C.O.G.). This creates a "pulse" on the plot of forward displacement versus time in FIG. 8.

Thus, the signature of the crash is a dramatic and extremely fast forward displacement of the combined C.O.G. of the occupant and the seat. The signature of the crash also includes a sharp drop-back of the combined C.O.G. that occurs shortly after the forward displacement. Compared to the displacement of the combined C.O.G. due to voluntary movement (FIG. 6), the displacement caused by a vehicle crash (FIG. 8) has marked differences. Specifically, the timing, slope, and amplitude of the "pulse" for the crash are not mimicked in any part of the displacement plot of FIG. 6.

The displacement plot for pre-crash braking (FIG. 7) does have an upward slope, but the slope is not as steep as the slope of the "pulse" in the plot for the crash (FIG. 8). Also, the overall forward displacement of the combined C.O.G. achieved is much further for the crash (FIG. 8) than for pre-crash braking (FIG. 7). Still further, the steep slope on the "pulse" in the plot for the crash (FIG. 8) begins sooner (nearer to time zero) than the steeper portion of the plot for pre-crash braking (FIG. 7). One reason for these differences is that a pre-crash braking deceleration of 1 G or less does not overwhelm the gravity component of C.O.G., as is the case in a crash.

Even further, the duration of the "pulse" in the plot for the crash (FIG. 8) is typically shorter that the duration of the convex bugle (above the maximum voluntary line) in the plot for pre-crash braking (FIG. 7). One reason for such a difference is that pre-crash braking can easily take a second or more in duration while a crash will cause the pulse to be on the order of only 100–150 ms.

Thus, as illustrated by FIGS. 6–8, it is to be understood that slope and/or magnitude based threshold tests performed within the C.O.G. crash determination portion 64 of the controller 34 would be sufficient to separate the three cases. Additionally, the height and/or duration of the crash-induced C.O.G. "pulse" in FIG. 8 could also provide a measure of crash severity.

It is to be appreciated that for the sake of simplicity, the above-discussed example was reduced to forward C.O.G. analysis using two weight sensors. It is to be appreciated that rearward C.O.G. analysis is readily obtainable using the illustrated structure. Also, lateral (i.e., right-left) C.O.G. analysis is obtainable using weight sensors places under the left and right portions of the seat. Further, with four separate weight sensors, it would be possible to monitor the motion of the C.O.G. along the fore-to-aft and lateral axes. This would allow a precise measurement of the crash direction to allow a differentiation between forward, side, and oblique crashes.

An event that merits consideration is a reaction due to a rough road condition, and the accelerations caused by the rough road. Specifically, consider a rapidly moving vehicle that encounters a bump that is sufficiently large to be of concern. As the vehicle rises over the bump, a vertical acceleration is applied to the vehicle. The vertical acceleration causes a net increase of the "weight" of the occupant and the seat. Also, a deceleration (i.e., a rearward force) is applied to the vehicle due to the energy lost in climbing the bump.

Conventional accelerometers and safing sensors see only the deceleration caused by the event of proceeding over the bump. Crash detection algorithms for systems that use only accelerometers and vehicle acceleration responsive safing sensors must be sufficiently sophisticated, and complicated, to properly identify the event of the vehicle proceeding over the bump and not misinterpret the event.

However, with the above-described structure in accordance with the present invention, identification of the event of the vehicle proceeding over the bump does not require undue complication. The deceleration can cause a rapid change in the position of the C.O.G. that is determined by the controller, but the rapid increase in net occupant "weight" is also registered within the controller. It is to be noted that a crash or pre-crash braking event primarily effects deceleration, but have little or no effect on weight. If there is an effect on weight from a crash or braking, it will tend to be less (e.g., as the occupant moves forward off the seat). Thus, the event of the vehicle proceeding over a bump can be discriminated from the events of a crash and pre-crash braking.

Figure 9:
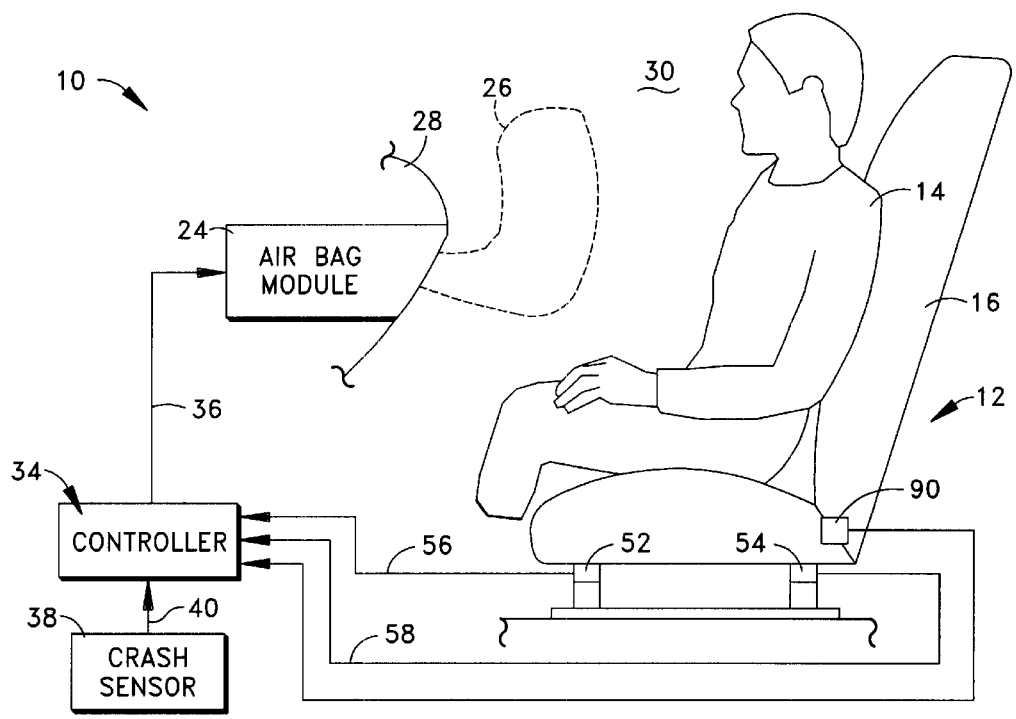
FIG. 9 is a schematic illustration of an occupant protection system in accordance with another embodiment of the present invention.

Another event to consider is the event of a rear seat occupant (typically a child) pressing, pulling, or kicking the front seat back. Such an event causes shifts in the location of the C.O.G. that could have characteristics that resemble characteristics associated with some other event (e.g., pre-crash braking or crash). Referring to FIG. 9, one solution that could help in the discrimination of such rear seat occupant events is to place load cells 90 or other weight responsive sensors in the joint between the seat bottom and seat back of the front seat. These sensors would be arranged so as to provide a measure of the torque and torque direction applied to the seat back. Typically, a front seat occupant can only apply rearward torque (unless the shoulder belt is incorporated in the seat back). Thus, any forward torque in the seat back over and above what could be achieved with crash or braking decelerations would necessarily have to come from the rear seat occupant, and the rear seat occupant induced event (e.g., seat kicking) would be identified.

Additionally, by comparing the torque on the seat back with the corresponding changes in the position of the C.O.G., it will be possible to determine if a C.O.G. change is coming entirely from the seat back torque. Specifically, any torque induced by deceleration would have components from the seat bottom and would be accompanied by a decrease in torque on the seat back from any occupant pressing against it. Thus, without such characteristics, torque can be attributable to the rear seat occupant pulling or pushing on the seat. Through analysis of these factors it may be possible to discriminate C.O.G. changes induced by the activities (e.g., pushing or pulling on the seat back) of the rear seat occupant.

Still further events to consider occur when the vehicle proceeds over a hill and/or around a turn. At the onset of a hill, the deceleration caused by the hill occurs much slower than deceleration caused by braking or a crash because the vehicle must physically move onto the grade of the hill. Specifically, the rise time on the movement of the C.O.G. caused by the hill will be slower than for a crash. Also, hills typically would not have a slope steeper than 45 degrees. Thus, the deceleration force is not that great, and the magnitude of any "pulse" in the plot of movement of the C.O.G. versus time will be much less than for a crash. These two factors can be used to eliminate any possibility of the event of the vehicle proceeding onto the hill being confused with a crash.

Separating the characteristics caused by a downhill grade of a hill from the characteristics caused by a pre-crash braking may pose some challenges. However, it is to be noted that during pre-crash braking, an occupant weight should remain about the same because all braking forces will be normal to the axis of sensitivity of the weight sensors. For the downhill grade, the occupant weight is decomposed into components normal to and parallel to the sensor axis of sensitivity. Thus, for the downhill grade, and even an uphill grade, a net drop in weight occurs. The drop in weight is proportional to the steepness of the slope.

Further, it is unlikely that any downhill slope would be able to generate the type of forward acceleration that is achieved in hard braking (i.e., 0.6–1.0 G). Thus, a net decrease in weight coupled with a certain level of C.O.G. shift (associated with a 45 degree or less slope) are two characteristics associated with a downhill slope that distinguish the downhill slope event from pre-crash braking.

Turn events are distinguishable from a crash for the same reasons (e.g., slow rise time and lower magnitude of C.O.G. shift) that a downhill motion event is distinguishable. There should be no need to separate pre-crash braking from turning acceleration because the concern should be directed more at determining the occurrence of a rollover event or a potential rollover condition. When considering actual or potential rollover, the magnitude of lateral acceleration is of concern, but the source of the lateral acceleration is not really of concern (i.e., a sharp turn and a sidewise skid can produce the same lateral acceleration and the same rollover threat). Thus, just sensing the fact that there is lateral acceleration and determining that it is not from a crash is adequate.

It is contemplated that one or more additional sensors 70 may be included within the occupant-based crash determination portion 20 to provide sensory information that is used to compensate for perturbances to the C.O.G. In the illustrated example, the compensation sensor(s) 70 are operatively connected to the C.O.G. location determination portion 62, and the information provided by the compensation sensor(s) 70 is used to adjust the location of the determined C.O.G. As an alternative to adjustment of the determined C.O.G., the information provided by the compensation sensor(s) 70 may be provided to the C.O.G. crash determination portion 64 and used therein as a factor (e.g., a mitigating factor) in the determination as to whether a vehicle crash condition is occurring.

It is contemplated that any type of sensor that provides information usable to compensate/adjust determinations regarding the C.O.G. can be employed within the occupant-based crash determination arrangement 20. Some examples of sensors that provide usable information include a vehicle speed sensor, a vehicle acceleration sensor, a drive-train torque sensor, a vehicle inclination sensor, and a vehicle tilt/rollover sensor.

The vehicle speed sensor may be a road wheel speed sensor and may be the same sensor that is used to provide a speed signal to an anti-lock braking system. The vehicle acceleration sensor may be a fore-to-aft axis sensor and/or a lateral axis sensor. Both speed and acceleration sensors provide information that indicates whether a change in C.O.G. is due to a crash condition or rough roads or the like. The drive-train torque sensor similarly provides information regarding whether a change to a C.O.G. is induced by operation of the vehicle.

The inclination sensor provides information that is usable to adjust a change to the C.O.G. due to the vehicle traversing a road with a steep incline. The vehicle tilt or rollover sensor provides information useful for providing 2-axis and lateral acceleration information. Such information is particularly useful for an occupant-based crash determination arrangement that includes determinations regarding lateral (side-to-side) changes of the C.O.G.

From the above description of the invention, those skilled in the art will perceive improvements, changes and modifications. For example, an array of weight sensors different than two sensors may be utilized. A basic example of such a weight sensor array includes the use of two front weight sensors and two rear weight sensors. Determinations regarding movement of the combined C.O.G. would be based upon combinations of plural weight values from appropriate weight sensors.

Also, although the preferred embodiment is described with regard to a combined center of gravity, contemplated that a different weight-based center characteristic associated with the occupant is usable to determine occurrence of a vehicle crash. For example, the center of gravity of the occupant alone (i.e., not a combined center of the occupant and the seat) is usable to determine the occurrence of a vehicle crash. The center of gravity of the occupant is determined using weight sensors located within the seat and thus do not have the weight of the seat bearing thereupon. Such improvements, changes and modifications within the skill of the art are intended to be covered by the appended claims.

Having described the invention, the following is claimed:

1. A vehicle crash determination arrangement comprising:
   means for sensing a weight value associated with an occupant located on a seat;
   means for determining a weight-based center characteristic associated with the occupant using the sensed weight value; and
   means for determining occurrence of a vehicle crash using change in the determined weight-based center characteristic associated with the occupant and for outputting a signal indicative of the determination of crash occurrence,
      wherein said means for sensing a weight value includes a plurality of weight sensors disposed beneath a vehicle seat, each for sensing a load from the seat and the occupant located on the seat, said means for determining a weight-based center characteristic includes means for determining center of gravity of the seat and the occupant, and
      wherein said means for determining occurrence of a vehicle crash includes means for determining an amount of displacement of the center of gravity of the seat and the occupant from an initial position.

2. An arrangement as set forth in claim 1, wherein said means for determining occurrence of a vehicle crash includes means for determining whether the amount of displacement of the center of gravity of the seat and the occupant exceeds a predetermined threshold.

3. A vehicle crash determination arrangement comprising:
   means for sensing a weight value associated with an occupant located on a seat;
   means for determining a weight-based center characteristic associated with the occupant using the sensed weight value;
   means for determining occurrence of a vehicle crash using change in the determined weight-based center characteristic associated with the occupant and for outputting a signal indicative of the determination of crash occurrence;
   wherein said means for sensing a weight value including a plurality of weight sensors disposed beneath a vehicle seat, each for sensing a weight value from the seat and the occupant being located on the seat, said means for determining a weight-based center characteristic using the sensed weight values, and said means for determining occurrence of a vehicle crash including means for determining the occurrence of a vehicle crash using change in the determined center of gravity; and
   means for sensing a vehicle condition and means for adjusting a determination regarding center of gravity and occurrence of a vehicle crash using the sensed vehicle condition.

4. An arrangement as set forth in claim 3, wherein said means for sensing a vehicle condition includes a vehicle speed sensor that provides a vehicle speed indicative signal.

5. An arrangement as set forth in claim 4, wherein said vehicle speed sensor also provides the vehicle speed indicative signal to a vehicle anti-lock brake system.

6. An arrangement as set forth in claim 3, wherein said means for sensing a vehicle condition includes a vehicle acceleration sensor that provides a vehicle acceleration indicative signal.

7. An arrangement as set forth in claim 3, wherein said means for sensing a vehicle condition includes a vehicle inclination sensor that provides a vehicle inclination indicative signal.

8. An arrangement as set forth in claim 3, wherein said means for sensing a vehicle condition includes a vehicle rollover sensor.

9. A vehicle c rash determination arrangement comprising:
   means for sensing a weight value associated with an occupant located on a seat;
   means for determining a weight-based center characteristic associated with the occupant using the sensed weight value;
   means for determining occurrence of a vehicle crash using change in the determined weight-based center characteristic associated with the occupant and for outputting a signal indicative of the determination of crash occurrence;
   wherein said means for sensing a weight value including a plurality of weight sensors disposed beneath a vehicle seat, each for sensing a weight value from the seat and the occupant being located on the seat, said means for determining a weight-based center characteristic using the sensed weight values, and said means for determining occurrence of a vehicle crash including means for determining the occurrence of a vehicle crash using change in the determined center of gravity; and
   means for sensing forward force applied to a back of the vehicle seat and means for adjusting determinations regarding center of gravity and occurrence of a vehicle crash using the sensed force.

10. An arrangement as set forth in claim 9, wherein said means for sensing force applied to a back of the vehicle seat includes means for measuring torque and torque direction applied to the seat back relative to a seat bottom.

11. An occupant protection system for an occupant located on a vehicle seat, said system comprising:
   an actuatable occupant protection device;
   control means for controlling actuation of said device; and
   a vehicle crash determination arrangement including:
      means for sensing a weight value associated with an occupant located on a seat;
      means for determining a weight-based center characteristic associated with the occupant using the sensed weight value; and
      means for determining occurrence of a vehicle crash using change in the determined weight-based center characteristic associated with the occupant and for outputting a signal indicative of the determination of crash occurrence to said control means;

wherein said means for sensing a weight value including a plurality of weight sensors disposed beneath a vehicle seat, each for sensing a weight value from the seat and the occupant located on the seat, said means for determining a weight-based center characteristic including means for determining center of gravity of the seat and the occupant using the sensed weight values, said means for determining occurrence of a vehicle crash including using change in the determined center of gravity, and said vehicle crash determination arrangement including means for sensing a vehicle condition and means for adjusting a determination regarding center of gravity and occurrence of a vehicle crash condition using the sensed vehicle condition.

12. An occupant protection system for an occupant located on a vehicle seat, said system comprising:

an actuatable occupant protection device;

control means for controlling actuation of said device; and a vehicle crash determination arrangement including:
  means for sensing a weight value associated with an occupant located on a seat;
  means for determining a weight-based center characteristic associated with the occupant using the sensed weight value;
  means for determining occurrence of a vehicle crash using change in the determined weight-based center characteristic associated with the occupant and for outputting a signal indicative of the determination of crash occurrence to said control means;
  means for sensing forward force applied to a back of the vehicle seat; and
  means for adjusting determinations regarding center of gravity and occurrence of a vehicle crash using the sensed force.

13. A system as set forth in claim 12, wherein said means for sensing force applied to a back of the vehicle seat includes means for measuring torque and torque direction applied to the seat back relative to a seat bottom.

14. A method of determining the occurrence of a vehicle crash, said method comprising:

sensing a weight value associated with an occupant located on a seat;

determining a weight-based center characteristic associated with the occupant using the sensed weight value;

determining occurrence of a vehicle crash using change in the determined weight-based center characteristic associated with the occupant;

outputting a signal indicative of the determination of crash occurrence;

wherein said step of sensing a weight value including sensing a weight value from the seat and the occupant located on the seat at each of a plurality of weight sensors disposed beneath the vehicle seat, said step of determining a weight-based center characteristic including determining center of gravity of the seat and the occupant using the sensed weight values, said step of determining occurrence of a vehicle crash including using change in the determined center of gravity, and said step of determining occurrence of a vehicle crash including determining whether a rate of change of the center of gravity of the seat and the occupant exceeds a predetermined threshold.

15. A method as set forth in claim 14, wherein said step of sensing a vehicle condition includes sensing vehicle speed and said step of adjusting includes adjusting using sensed vehicle speed.

16. A method as set forth in claim 14, further including the step of providing a signal indicative of the determination of occurrence of a vehicle crash to a control means for an actuatable occupant protection device.

17. A method of determining the occurrence of a vehicle crash, said method comprising:

sensing a weight value associated with an occupant located on a seat;

determining a weight-based center characteristic associated with the occupant using the sensed weight value;

determining occurrence of a vehicle crash using change in the determined weight-based center characteristic associated with the occupant;

outputting a signal indicative of the determination of crash occurrence;

wherein said step of sensing a weight value including sensing a weight value from the seat and the occupant located on the seat at each of a plurality of weight sensors disposed beneath the vehicle seat, said step of determining a weight-based center characteristic including determining center of gravity of the seat and the occupant using the sensed weight values, and said step of determining occurrence of a vehicle crash including using change in the determined center of gravity; and including sensing forward force applied to a back of the vehicle seat and adjusting determinations regarding center of gravity and occurrence of a vehicle crash using the sensed force.

18. A method as set forth in claim 17, wherein said step of sensing force applied to a back of the vehicle seat includes measuring torque and torque direction applied to the seat back relative to a seat bottom.

19. A vehicle crash determination arrangement comprising:

means for sensing a weight value associated with an occupant located on a seat, said means for sensing a weight value including a plurality of weight sensors disposed beneath the vehicle seat, each weight sensor sensing a load from the seat and the occupant located on the seat;

means for determining a weight-based center characteristic associated with the occupant by using the sensed weight value, said means for determining a weight-based center characteristic including means for determining center of gravity of the seat and the occupant; and means for determining occurrence of a vehicle crash and for outputting a signal indicative of a determination of crash occurrence, said means for determining occurrence of a vehicle crash including means for monitoring a rate of change of a location the center of gravity of the seat and the occupant and for determining if the rate of change exceeds a predetermined threshold.

20. An arrangement as set forth in claim 19, wherein said arrangement is within an occupant protection system for the occupant located on the vehicle seat, the system includes an actuatable occupant protection device and control means for controlling actuation of the device.

* * * * *